US008634478B2

(12) United States Patent
Ciardi (10) Patent No.: US 8,634,478 B2
(45) Date of Patent: Jan. 21, 2014

(54) LINEAR TIME CODE RECEIVER (75) Inventor: John Joseph Ciardi, Portland, OR (US)

(73) Assignee: GVBB Holdings S.A.R.L., Luxembourg (LU)

(*) Notice: Subject to any disclaimer, the term of this patent is extended or adjusted under 35 U.S.C. 154(b) by 1638 days.

(21) Appl. No.: 10/555,850

(22) PCT Filed: Jan. 26, 2004

(86) PCT No.: PCT/US2004/002143
§ 371 (c)(1),
(2), (4) Date: Nov. 7, 2005

(87) PCT Pub. No.: WO2004/102219
PCT Pub. Date: Nov. 25, 2004

(65) Prior Publication Data
US 2006/0227879 A1 Oct. 12, 2006

Related U.S. Application Data (60) Provisional application No. 60/469,437, filed on May 9, 2003.

(51) Int. Cl.
H04N 7/12 (2006.01)

(52) U.S. Cl.
USPC ...... 375/240.28; 375/354; 375/355; 375/365; 375/366

(58) Field of Classification Search
USPC .............. 375/354–355, 364–366, 240.28
See application file for complete search history.

(56) References Cited

U.S. PATENT DOCUMENTS

| 5,200,980 | A | | 4/1993 | Briddell | |
|---|---|---|---|---|---|
| 5,551,016 | A | | 8/1996 | Loeb et al. | |
| 5,857,044 | A | * | 1/1999 | Ogawa et al. | 386/202 |
| 6,222,980 | B1 | * | 4/2001 | Asai et al. | 386/65 |
| 6,393,198 | B1 | * | 5/2002 | LaMacchia | 386/285 |

(Continued)

FOREIGN PATENT DOCUMENTS

| JP | 7303034 A | 11/1995 |
|---|---|---|
| JP | 10289535 A | 10/1998 |
| JP | 2001069438 A | 3/2001 |
| JP | 2001358784 A | 12/2001 |

OTHER PUBLICATIONS http://en.wikipedia.org/wiki/State_machine.*

(Continued)

Primary Examiner — Chieh M Fan
Assistant Examiner — Freshteh N Aghdam
(74) Attorney, Agent, or Firm — Arent Fox LLP (57) ABSTRACT An Linear Time Code (LTC) receiver for receiving and decoding a LTC frame of the type used in connection with film and television and accompanying audio includes a first counter that measures the number of reference clock periods within the duration of a bi-phase mark signal interval to yield a timing reference for extracting the payload from the LTC frame. A second counter detects a sync field within the LTC frame to establish the LTC frame direction. A third counter serves to count the number of symbols in the LTC frame. A state machine responsive to the counts of the first, second and third counters, serves to (a) detect a valid synchronization sequence within an incoming LTC frame; (b) determine the LTC frame direction, (c) decode (extract) payload information from the LTC frame; and (d) transfer the payload information in an order determined by the LTC frame direction.

15 Claims, 5 Drawing Sheets

(56) References Cited

U.S. PATENT DOCUMENTS

| | | | |
|---|---|---|---|
| 6,429,902 B1* | 8/2002 | Har-Chen et al. | 348/518 |
| 7,333,478 B2* | 2/2008 | Wiebe | 370/352 |
| 7,398,007 B2* | 7/2008 | Isozaki | 386/84 |
| 2003/0091339 A1* | 5/2003 | Isozaki | 386/96 |

OTHER PUBLICATIONS

Lampe, Hans-Jurgen: Modules for Time Code Technology, Part 1: LTC Modules, Technische Mitteilungen des RFZ, Vol. 30, No. 2, 1986, pp. 34-38. Deutsche Post, Central Radio and Television Engineering Office.

Notice of Reasons for Rejection transmitted Dec. 13, 2011, and English translation therof, in JP Patent Application No. 2006-532266).

Notice of Reason for Rejection from the Japanese Patent Office for Japanese Application No. 2006532266, dated Dec. 13, 2011.

European Patent Office of Application No. 04705299.8 of the Netherlands, mailed Feb. 7, 2013.

International Preliminary Report on Patentability for PCT Application No. PCT/US2004/002143, mailed May 9, 2013.

International Search Report for PCT Application No. PCT/US/002143, mailed Mar. 22, 2006.

Written Opinion of the International Searching Authority for PCT Application No. PCT/US2004/002143.

* cited by examiner

FIG. 5

LINEAR TIME CODE RECEIVER

CROSS REFERENCE TO RELATED APPLICATION

This application claims the benefit, under 35 U.S.C. §365 of International Application PCT/US04/002143, filed Jan. 26, 2004 which was published in accordance with PCT Article 21(2) on Nov. 25, 2004 and which claims the benefit of United States provisional patent application No. 60/469,437, filed May 9, 2003.

TECHNICAL FIELD

This invention relates to a technique for decoding (extracting) a Linear Time Code (LTC) frame of the type used in connection with film and television and accompanying audio.

BACKGROUND ART

Figure 1:
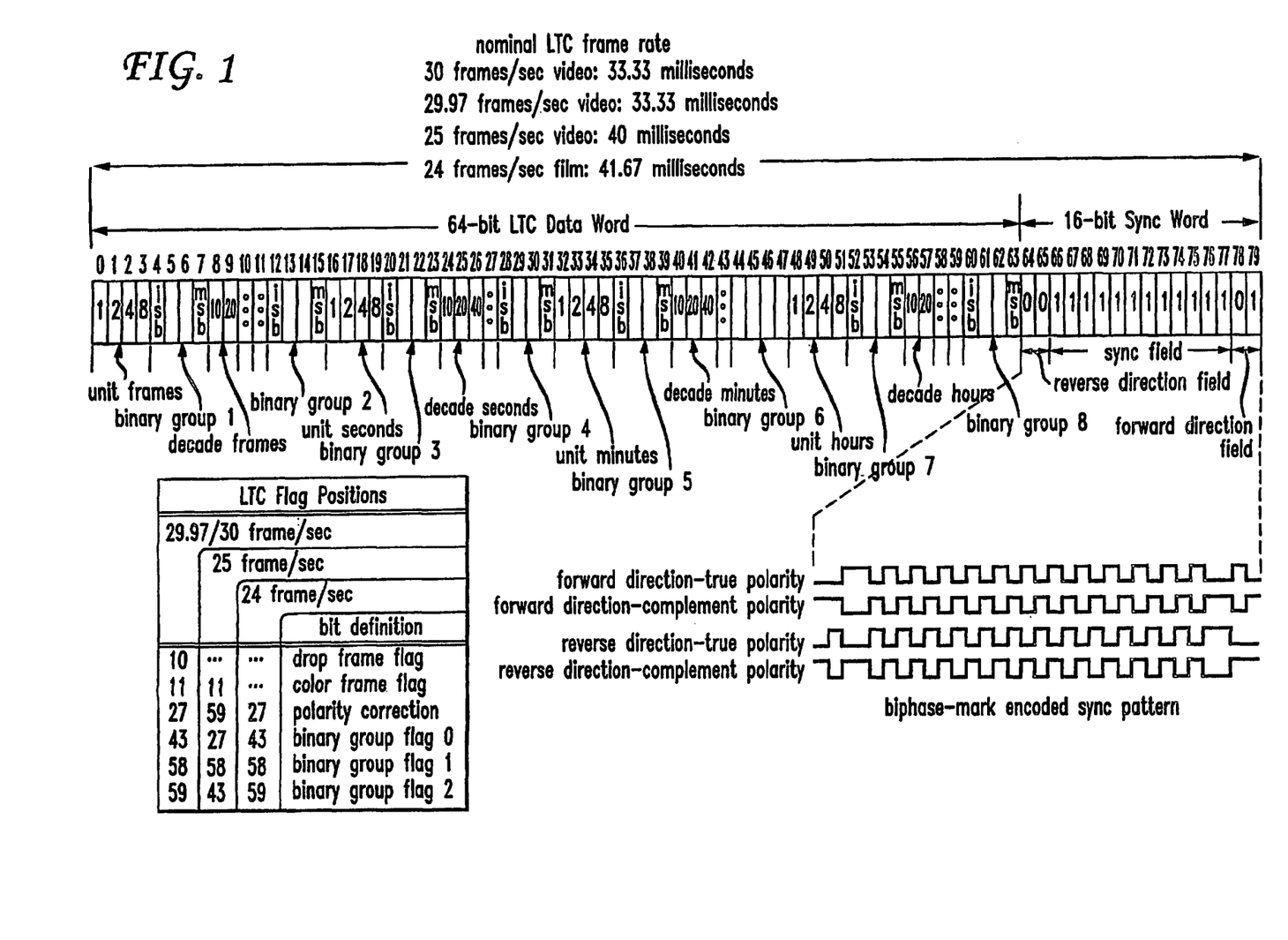
FIG. 1 depicts a graphical representation of a conventional LTC frame.

As described in the Society for Motion Picture and Television Engineers (SMPTE) Standard 12M: "Time Code and Control for Television, Audio, and Film", a Linear Time Code (LTC) frame serves as a mechanism for communicating digital time-stamp and control code information for use in television, film, and accompanying audio systems operating at 30, 29.97, 25, and 24 frames/second. Each LTC code frame contains 80 bits numbered 0 through 79 that are generated serially beginning with bit 0 for a "forward" time code and bit 79 for a "reverse" time code. Each successive LTC frame begins where the previous frame left off. Each 80-bit LTC frame comprises a 64-bit LTC data word (payload) and a 16-bit static synchronization sequence. Each LTC frame contains a unique time stamp for an associated video or film frame that include four binary-coded-decimal (BCD) fields representing hours, minutes, seconds, and frames. The nominal bit rate for a LTC frame is Fs=80*Fr, where Fr is the associated nominal video or film frame rate. In addition to the BCD-formatted time stamp, 32 bits remain available within a LTC data word for user-defined purposes. FIG. 1 depicts an exemplary LTC frame.

The sixteen bits in the synchronization sequence within the LTC frame enable LTC receiving equipment to accurately delineate LTC frames and identify bit positions within each frame. The LTC frame synchronization pattern is unique in that the same bit combination cannot be generated by any combination of valid data values in the remainder of the frame. The twelve central bits of the 16-bit synchronization pattern are all logic one. The leading two bits are both zero while the trailing two bits are logic zero followed by logic one. The different leading and trailing bit pair patterns allow an LTC receiver to determine the direction (forward/reverse) of the LTC frame.

The 80-bit NRZ binary data comprising an LTC frame is bi-phase-mark encoded according to the following rules specified in Standard 12M:
- A transition occurs at each bit symbol boundary regardless of the bit value;
- A logic one is represented by an additional transition occurring at the bit symbol midpoint; and
- A logic zero is represented by having no additional transitions within the bit symbol.

The bi-phase-mark encoded signal has no dc component, is amplitude and polarity insensitive, and contains significant spectral energy at the bit symbol rate. Therefore, a LTC frame qualifies as a self-clocking data stream because a Phase Lock Loop (PILL) can lock to this stream and extract the bit-rate clock. The LTC frame can be recorded on an audio linear tape track.

Heretofore, LTC receivers have used an analog PLL. As discussed above, the LTC Frame utilizes a synchronization technique that makes use of a transition at the bit symbol boundary for both logic zero and logic one binary symbol values, plus an additional mid-symbol transition for logic one bit symbols. Because the frame has high spectral energy at the symbol rate, the PLL can frequency lock its local oscillator to the symbol rate of the bi-phase-mark encoded LTC frame. A "data-slicing" circuit operating at a multiple of the recovered symbol clock can more than recover the 64 payload bits per frame of time code data.

Present day LTC receivers that utilize an analog PLL suffer from the disadvantage that the PLL clock recovery circuit has to work over a symbol rate of x/30 to 80×the nominal symbol rate of 2400 bits/sec for a 525 line/60 field video format (80 bits/frame×30 frames/sec). Designing a voltage-controlled oscillator (VCO) that works over this wide an input reference range often proves difficult. Moreover, analog circuitry typically requires calibration to achieve repeatable results.

BRIEF SUMMARY OF THE INVENTION

Briefly, in accordance with the present principles, there is provided a method for receiving a Linear Time Code (LTC) frame. The method commences upon detecting a valid synchronization sequence within an incoming LTC frame while measuring a predetermined symbol interval relative to a reference clock. Next the LTC frame direction is determined. Using measured symbol interval, payload information is then extracted from the LTC frame and that payload information is transferred for storage in a fixed order.

DETAILED DESCRIPTION

Figure 2:
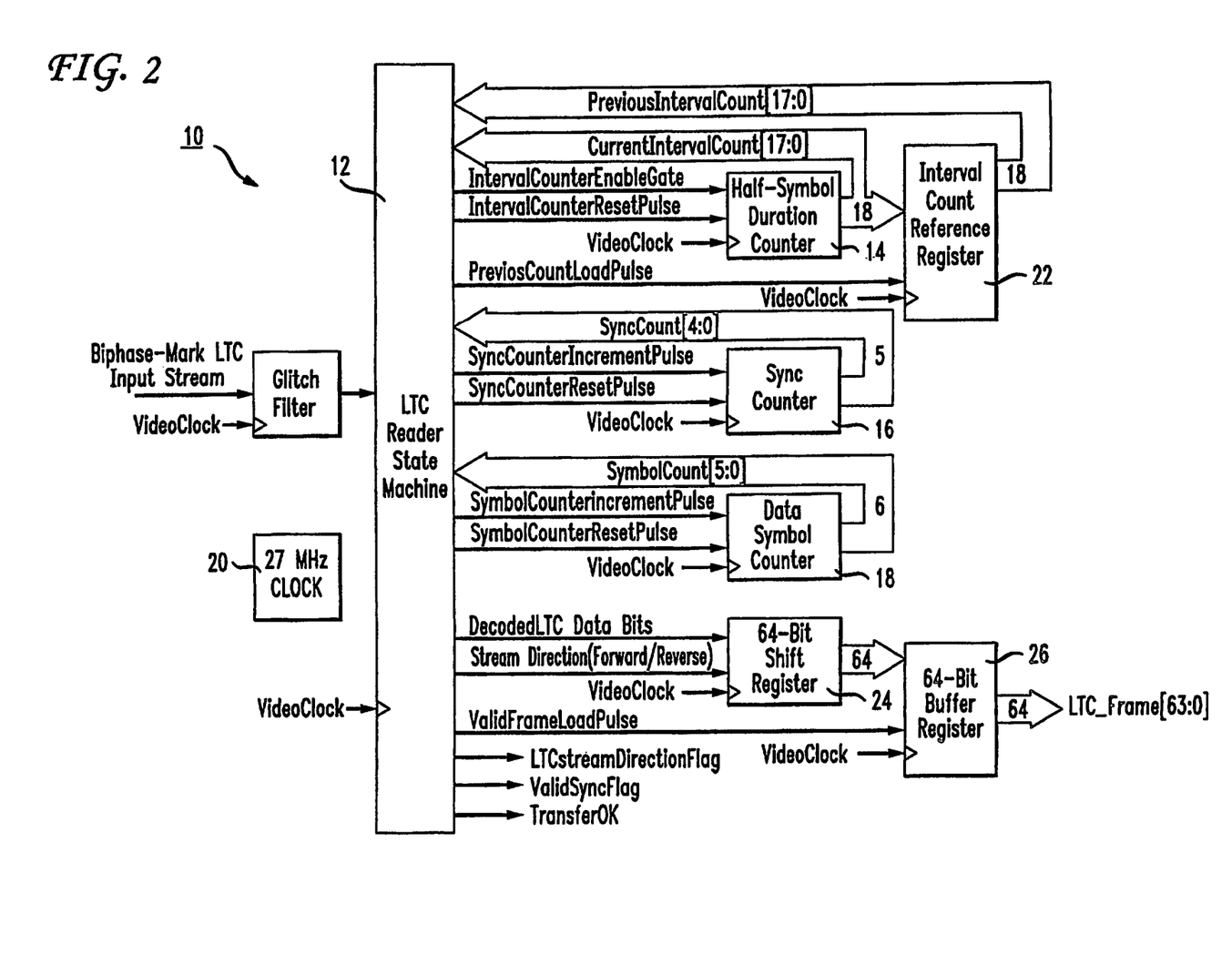
FIG. 2 depicts block schematic diagram of a Linear Time Code (LTC) receiver in accordance with a preferred embodiment of the present principles.

FIG. 2 depicts a block schematic diagram of a LTC receiver 10 in accordance with a preferred embodiment of the present principles for decoding (extracting) payload information from an LTC frame of the type depicted in FIG. 1. The receiver 10 of FIG. 2 includes a state machine 12 that has fifty-five states. The states of the state machine 12, described hereinafter with respect to the state diagrams of FIGS. 3-5, effect LTC frame payload decoding (extraction) by the steps of:

1. Detecting a valid bi-phase-mark sync sequence while simultaneously measuring the current frame's half-symbol interval
2. Detecting the bi-phase-mark stream direction: forward or reverse; and
3. Extracting the 64 bits of data from the bi-phase-mark encoded stream for storage in the correct bit order, regardless of stream direction.

To facilitate LTC frame payload extraction, the LTC receiver 10 includes three counters 14, 16, and 18; all clocked by a 27 MHz. clock 20 that also clocks the state machine 12. Counter 14 bears the designation "Half-Symbol Duration counter" because the counter counts the number of clock periods of the 27 MHz reference clock 20 that occur within the duration of a bi-phase-mark half-symbol interval. The Half Symbol Duration Counter 14 commences counting upon receipt of a signal "IntervalCounterEnableGate" from the state machine 12 and the counter becomes reset in responsive to a reset signal "IntervalCounterEnableResetPulse" from the state machine.

To better understand how the count of the Half-Symbol Duration counter 14 provides a measure of the half-symbol interval, refer to the format of the LTC frame depicted in FIG. 1. As shown, the bits of the 16-bit sync word are bi-phase mark encoded. By virtue of such bi-phase mark encoding, the one's bits undergo a change in phase at twice the symbol rate. Thus, by counting the number of 27 MHz clock periods between alternations of the one's bit in the sync word, the Half-Symbol Duration counter 14 provides a count corresponding to half of the symbol rate to facilitate decoding (extraction) of the data contained in the 64-bit payload of the LTC frame of FIG. 1.

The Half-Symbol Duration Counter 14 of FIG. 2 supplies its count to the state machine 12 and to a register 22. The register 22, designated as the "Interval Count Reference Register", stores the count of the counter 14 for input at the state machine 12 following the receipt of a state machine signal "PreviousCountLoadPulse." In this way, the Interval Count Reference Register 22 provides a previous interval count to the state machine 12 during the sync detection state of the decoding (extraction) process. The previous interval count serves as a timing reference for parsing the 64-bit payload of the LTC frame of FIG. 1. The number of 27 MHz. Clock periods occurring within a half-symbol bi-phase mark for a specified range of frame rates appears in the Table I below, where X is a nominal LTC frame rate.

logic ones comprising the sync field within the 80-bit NRZ (non-return to zero) binary data frame comprising the LTC frame.

Counter 18 bears the designation "Data Symbol Counter" because it serves to count the number of decoded (extracted) data words shifted out from the state machine 12 into a sixty-four-bit shift register 24. The Data Symbol Counter 18 commences counting in response to a signal "SymbolCounterIncrementPulse" received from the state machine 12. The direction at which the shift register 24 shifts out the data words to a sixty-four-bit buffer 26 depends on the state of a signal "Stream Direction" received by the shift register from the state machine 12. The bit buffer 26 serves to output the bits received from the shift register 24 in response to the state of a signal "ValidFrameLoadPulse" received from the state machine 12. As its name implies, the ValidFrameLoadPulse signal serves to trigger the shift register 26 upon a determination by the state machine 12 that valid frame information has been output to the shift register 24.

In addition to the various signals described thus far, the state machine also generates several other signals. These signals include: (a) a "LTC Stream direction Flag" that designates the direction of the LTC frame, (b) a "Valid Sync Flag" that designate whether the synchronization of the LTC frame is valid, and (c) a "Transfer OK signal" that reflects whether a valid transfer of the LTC data has occurred.

Proper operation of the state machine 12 depends on its ability to change states in synchronism with the bi-phase mark transitions within an incoming LTC frame. Hence, filtering of an incoming LTC frame becomes important. To that end, the LTC receiver 10 of FIG. 2 includes a glitch filter 30 at its input to filter out bi-phase mark transitions of a duration less that the minimum half symbol duration associated with the X/30 stream rate. Assuming a reference clock frequency of 27 MHz, the minimum half-symbol duration is seventy.

Figure 3:
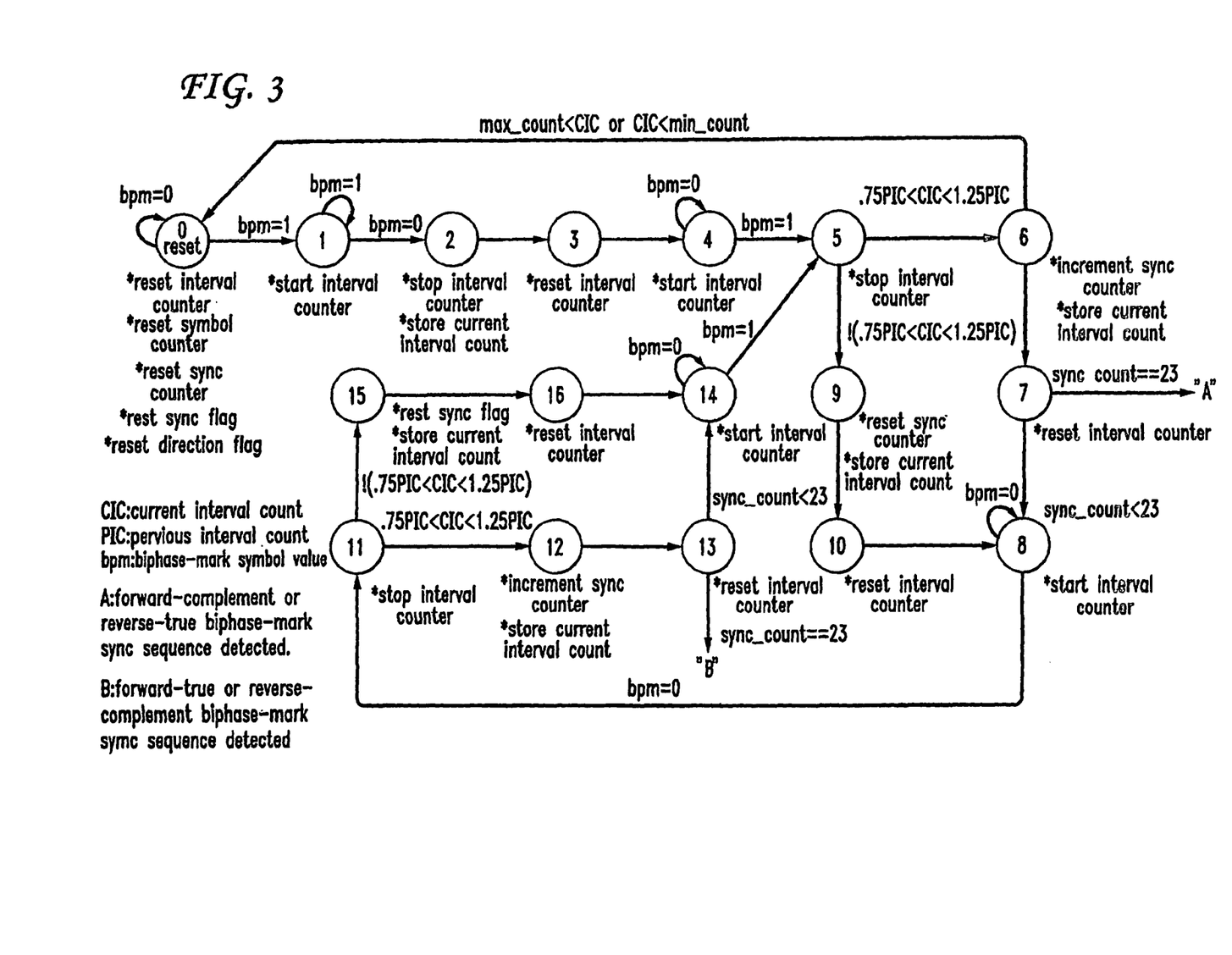
FIG. 3 depicts a state diagram for a state machine within the LTC receiver of FIG. 2 to illustrate the machine states for effecting sync detection and symbol interval measurement.

FIG. 3 graphically depicts the first sixteen states of the state machine 12 associated with sync detection and symbol interval measurement. As discussed in greater detail below, sixteen state transitions are required to detect the sync pattern

TABLE I

| video/film frame rate | nominal clock count (nominal frame rate: X) | maximum clock count (minimum frame rate: X/30) | minimum clock count (maximum frame rate: 80*X) |
| --- | --- | --- | --- |
| 30 frames/sec | 5625 clocks/half-symbol | 168,750 clocks/half-symbol | 70.31 clocks/half-symbol |
| 29.97 frames/sec | 5630.6 clocks/half-symbol | 168,918.75 clocks/half-symbol | 70.38 clocks/half-symbol |
| 25 frames/sec | 6750 clocks/half-symbol | 202,500 clocks/half-symbol | 84.38 clocks/half-symbol |
| 24 frames/sec | 7031.25 clocks/half-symbol | 210,937.5 clocks/half-symbol | 87.89 clocks/half-symbol |

The minimum required count of clock periods is seventy while the maximum count is 210,947. The Half-Symbol Duration counter 14 has an eighteen-bit width ($2^{18}$=266,144) to accommodate X/30 LTC stream rates. The 27 MHz reference clock 20 provides sufficient resolution for the very short bit symbol periods encountered during 80*X stream rates.

The counter 16 bears the designation "Sync Counter" because the counter counts the number of bits decoded from the 16-bit synch field of the LTC frame of FIG. 1. The Sync Counter 16 commences counting responsive to the receipt of "SyncCounterIncrementPulse" from the state machine 12 and becomes reset upon receipt of a pulse, designated as "SyncCounterResetPulse". The Sync Counter 16, which has a five-bit width, serves to detect the twenty-four alternating logic one's and zero's of half symbol duration in the synch field of the LTC frame. This sequence constitutes the bi-phase-mark encoded equivalence of the twelve consecutive and measure the bi-phase-mark half-symbol duration of the twenty-four alternating 0-1 sync patterns. To detect the sync sequence, the interval count, in 27 MHz clock periods, of the period between bi-phase-mark transitions via the half-symbol interval counter is continually captured. If the current interval count is within +/−25% of the previous interval count, the Sync Counter 16 is incremented, otherwise the Sync Counter is reset to zero. When the count of the Sync Counter 16 reaches twenty-four, the "valid sync" flag is set and the state machine 12 transitions to the bit stream direction detection sequence of FIG. 4. The previous interval count stored in the Interval Count Reference Register 22 now becomes the reference for bi-phase-mark half-symbol duration (half of a NRZ logic 1) for the rest of the frame. An interval count within +/−25% of twice this count indicates a bi-phase-mark full-symbol duration (a NRZ logic 0).

The Sync detection and Symbol Interval detection process upon execution of State 0 (the reset state, which occurs initial power up. Upon entering State 0, the counters 12, 14, and 16 become reset, as do the sync flag and the LTC Stream direction Flag. The state machine 12 of FIG. 2 remains at State 0 as long as the bi-phase mark symbol value remains zero. Upon a change of the bi-phase mark symbol value to a logic 1 level, the state machine 12 enters State 1 of FIG. 3 and triggers the Half Symbol Duration counter 14 of FIG. 2 to start counting. The Half Symbol Duration counter 14 continues to count until the bi-phase mark symbol value returns to zero at which time the state machine 12 enters State 2, whereupon the Half Symbol Duration counter 14 stops counting, and its current count is stored. Following State 2, State 3 becomes active, whereupon the Half Symbol Duration counter 14 becomes reset.

State 4 becomes active following State 3 and the Half Symbol Duration counter 14 commences counting again. The state machine 12 remains in State 4 so long as the bi-phase mark symbol value remains zero. When the bi-phase mark symbol value changes to a logic one, the state machine 12 enters State 5 of FIG. 3, whereupon, the Half Symbol Duration Counter 14 stops counting. Following State 5, the state machine 12 enters one of several different states depending on the value of the Current Interval Count (CIC) of the Half Symbol Duration Counter 14 and its relation to the Previous Interval Count (PIC) of the Interval Count Reference Register 22. If the CIC exceeds a maximum count (max_count), representing a condition where the actual LTC symbol rate exceeds the maximum allowable LTC bit symbol rate, or the CIC is less than a minimum count (min_count), representing a condition where the actual LTC bit symbol rate lies below a minimum allowable LTC symbol rate, then the state machine 12 returns to State 0 after State 5. In this way, the state machine 12 re-initiates the sync detection and symbol interval measurement process after encountering a symbol rate that is too high or too low.

Upon finding that the condition min_count<CIC<max_count true, then the state machine makes a determination whether the condition 0.75 PIC<CIC<1.25 PIC is true. In other words, the state machine 12 makes a determination after State 5 whether the CIC lies within ±25% of the value of the PIC. If so, the state machine 12 enters State 6, whereupon the state machine 12 increments the Sync Counter 16 and then stores the current count of the Half Symbol Duration Counter 14. Following State 6, the state machine 12 enters State 7 of FIG. 3 whereupon a check occurs whether the count (i.e., the "sync" count) of the Sync Counter 16 of FIG. 2 equals or exceeds twenty-three. Upon finding this condition met, the state machine 12 knows proper synchronization with the received LTC frame exists, thus enabling the state machine to transition to the bit stream direction detection sequence by entering state 17 of FIG. 4 described hereinafter.

Should state machine 12 find the sync count of the Sync Counter 16 less than twenty-three during State 7, indicating lack of detection of a complete sync pattern, State 8 becomes active, whereupon the Half Symbol Duration Counter 14 commences counting. State 8 remains active so long as the bi-phase mark symbol value remains at a logic one. Once the bi-phase mark symbol value transitions to a logic zero level, the state machine 12 of FIG. 2 enters State 11 of FIG. 3, whereupon the Half Symbol Duration Counter 14 stops counting. From State 11, the state machine 12 enters State 12 of FIG. 3 upon finding the condition 75PIC<CIC<1.25 PIC to be true. During State 12 of FIG. 3, the state machine 12 of FIG. 2 increments the Sync Counter 16 and stores the current count of the Half Symbol Duration Counter 14 prior to entering State 13. During State 13, the state machine 12 resets the Half Symbol Duration Counter 14 and also determines whether or not the sync count of the Sync Counter 16 equals or exceeds twenty-three. If so, the state machine 12 proceeds to the bit stream direction detection sequence by entering state 27 of FIG. 4 described hereinafter.

If, during State 11 of FIG. 3, the condition 0.75PIC<CIC<1.25 PIC is not true, the current value in the Interval Count Reference Register 22 is an invalid half-symbol duration count and the search for a valid sync pattern must restart. The state machine 12 enters State 15 during which the state machine resets the Sync Counter 16 and stores the interval count of the Half Symbol Duration Counter 14. This count is the new timing reference for detecting a valid sync pattern. State 16 next becomes active during which the state machine 12 resets the Half Symbol Duration Counter 14, both of FIG. 2. Following state 16, or following State 13 if the sync count does not equal or exceed 23, State 14 becomes active during which the Half Symbol Duration Counter 14 commences counting. State 14 remains active until the bi-phase mark symbol value becomes 1.

As discussed above, the state machine 12 enters State 6 following State 5 finding both conditions min_count<CIC<max_count and 0.75PIC<CIC<1.25 PIC to be true. However, should the state machine 12 find the conditions min_count<CIC<max_count true but the condition 0.75PIC<CIC<1.25 PIC false, then State 9 becomes active. This state transition indicates the current value in the Interval Count Reference Register 22 is an invalid half-symbol duration count and the search for a valid sync pattern must restart, whereupon the Sync Counter 16 becomes resent and the interval count of the Half Symbol Duration Counter 14 is stored. This value is the new timing reference for detecting a valid sync pattern. Thereafter, State 10 becomes active whereupon the Half Symbol Duration Counter 14 becomes reset before entering State 8 described previously.

Figure 4:
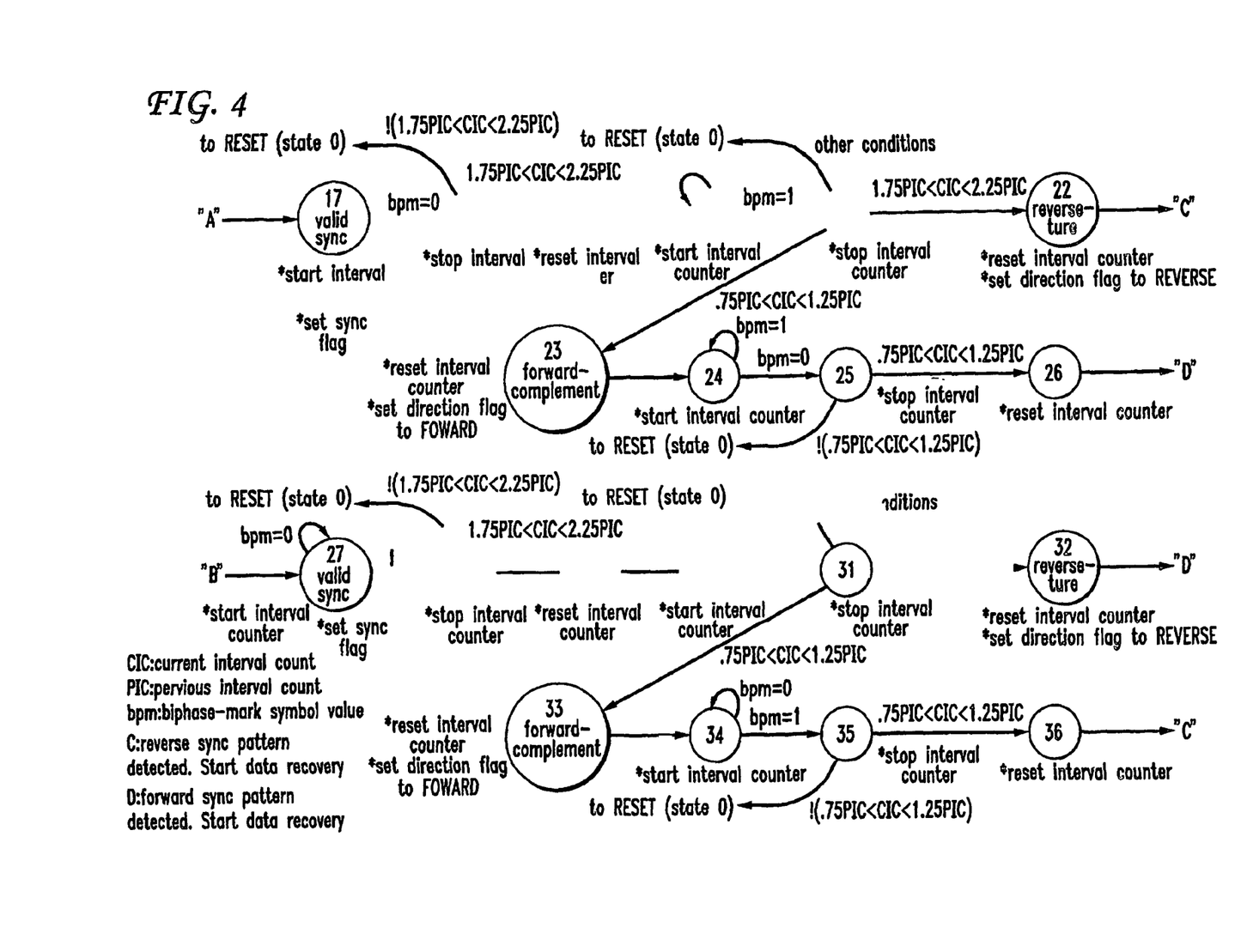
FIG. 4 depicts a state diagram for the state machine within the LTC receiver of FIG. 2 to illustrate the machine states for effecting bit stream direction detection.

FIG. 4 depicts the state diagram illustrating the states associated with LTC frame bit stream detection. Two separate 10-state sequences exist for stream direction determination. Which 10-state sequence is chosen depends on the polarity of the sync field detected during the sync detection state sequence described previously with respect to FIG. 3. The stream direction detection sequence searches for the bi-phase-mark encoded equivalence of the "01" forward or "00" reverse NRZ bit fields. When the direction is determined, the direction flag is asserted to either Forward or Reverse, and the state machine transitions to the data decoding (extraction) sequence described hereinafter with respect to FIG. 5.

Referring to FIG. 4, the first of the two ten-sequence states associated with bit stream direction detection commences with State 17 becoming active following State 7 of FIG. 3, whereupon, the Half Symbol Duration Counter 14 of FIG. 2 commences counting, and the sync flag becomes set. When active, this flag indicates a valid LTC sync pattern has been detected. State 17 remains active so long as the bi-phase mark symbol value remains at a logic one level. Upon a transition of the bi-phase mark symbol value to a logic zero level, State 18 becomes active and the Half Symbol Duration Counter 14 stops counting. Thereafter, State 19 becomes active when the condition 1.75 PIC<CIC<2.25 PIC is true. If the condition is false, the detected direction bit pattern is invalid, and the state machine 12 resets itself by transitioning to State 0. When State 19 becomes active, the state machine 12 of FIG. 2 resets the Half Symbol Duration Counter 14.

State 20 becomes active following State 19, and the Half Symbol Duration Counter 14 commences counting. State 20 remains active until so long as the bi-phase mark symbol value remains at a logic zero. Once the bi-phase mark symbol value transitions to a logic one level, the state machine 12 enters State 21. During State 21, the Half Symbol Duration Counter 14 stops counting. After State 21, the state machine 12 of FIG. 2 enters State 22 when the condition 1.75 PIC<CIC<2.25 PIC is true; or enters State 23 when the condition 0.75 PIC<CIC<1.25 PIC is true. If neither condition is true, the detected direction bit pattern is invalid and the state machine 12 resets by transitioning to State 0). The entry into State 22 reflects the detection of a reverse direction sync pattern. During State 22, the state machine 12 resets the Half Symbol Duration Counter 14 and sets the direction flag to "REVERSE" to indicate detection of a reverse sync pattern before proceeding to State 37 described hereinafter with respect to the FIG. 5.

As described, State 23 becomes active following State 21 when the condition 0.75 PIC<CIC<1.25 PIC is found to be true. During State 23, the Half Symbol Duration Counter 14 becomes reset, and the direction flag is set to FORWARD. Thereafter, State 24 becomes active and the Half Symbol Duration Counter 14 commences counting. State 24 remains active so long as the bi-phase mark symbol value remains at a logic one level. Once the bi-phase mark symbol value transitions to a logic zero, State 25 becomes active and the Half Symbol Duration Counter 14 stops counting. Following state 25, State 26 becomes active when 0.75 PIC<CIC<1.25 PIC is true, otherwise State 0 becomes active. Transitioning to State 0 indicates an invalid direction bit pattern was detected, and the state machine 12 is reset. Upon state 25 becoming active, the Half Symbol Duration Counter 14 stops counting. Thereafter, State 26 becomes active during which the Half Symbol Duration Counter 14 becomes reset. As described in greater detail with respect to FIG. 5, state 44 becomes active following state 26.

Referring to FIG. 4, the state machine 12 enters State 27 following State 13 of FIG. 3 upon determining that the sync count of the Sync Counter 16 equals or exceeds twenty-three. Upon entering State 27, the state machine 12 of FIG. 2 starts the Half Symbol Duration Counter 14 and sets the sync flag to signify a valid sync condition. State 27 remains active as long as the bi-phase mark symbol value remains at a logic zero level. Once the bi-phase mark symbol value transitions to a logic 1 level, State 28 becomes active and the Half Symbol Duration Counter 14 stops counting. State 29 becomes active after State 28 if the condition 1.75 PIC<CIC<2.25 PIC is true. Otherwise, State 0 becomes active. Transitioning to State 0 indicates an invalid direction bit pattern was detected, and the state machine 12 is reset. When State 29 becomes active, the state machine 12 of FIG. 2 resets the Half Symbol Duration Counter 14.

State 30 becomes active after State 29, whereupon the Half Symbol Duration Counter 14 commences counting. State 30 remains active so long as the bi-phase mark symbol value remains at a logic one level. Once the bi-phase mark symbol value transitions to a logic zero level, State 31 becomes active, whereupon the Half Symbol Duration Counter 14 stops counting. From State 31, the state machine 12 of FIG. 2 enters State 32 when the condition 1.75 PIC<CIC<2.25 PIC is true; or enters State 33 when the condition 0.75 PIC<CIC<1.25 PIC is true. If neither condition is true, the state machine 12 enters State 0. Transitioning to State 0 indicates an invalid direction bit pattern was detected, and the state machine 12 is reset. Upon entering State 32, the Half Symbol Duration Counter 14 becomes reset, and the direction flag is set to "REVERSE". Thereafter, the state machine 12 enters State 44 of FIG. 5 as described hereinafter.

Upon finding the condition 75 PIC<CIC<1.25 PIC to be true, the state machine 12 of FIG. 2 enters state 33 of FIG. 4. During State 33, the state machine 12 resets the Half Symbol Duration Counter 14 and sets the direction flag to "FORWARD." Thereafter, State machine enters State 34, whereupon the Half Symbol Duration Counter 14 begins counting. State 34 remains active so long as the bi-phase mark symbol value remains a logic zero value. Once the bi-phase mark symbol value transitions to a logic one value, the state machine 12 enters State 35, whereupon the Half Symbol Duration Counter 14 stops counting. During State 35, the Half Symbol Duration Counter 14 stops counting. If the condition 75 PIC<CIC<1.25 PIC is found to be true, then State 36 becomes active following State 36 becomes active, whereupon the Half Symbol Duration Counter 14 becomes reset before proceeding to State 37 of FIG. 5. Otherwise, if the condition 75 PIC<CIC<1.25 PIC isn't true, State 0 becomes active after State 35. Transitioning to State 0 indicates an invalid direction bit pattern was detected, and the state machine 12 is reset.

Figure 5:
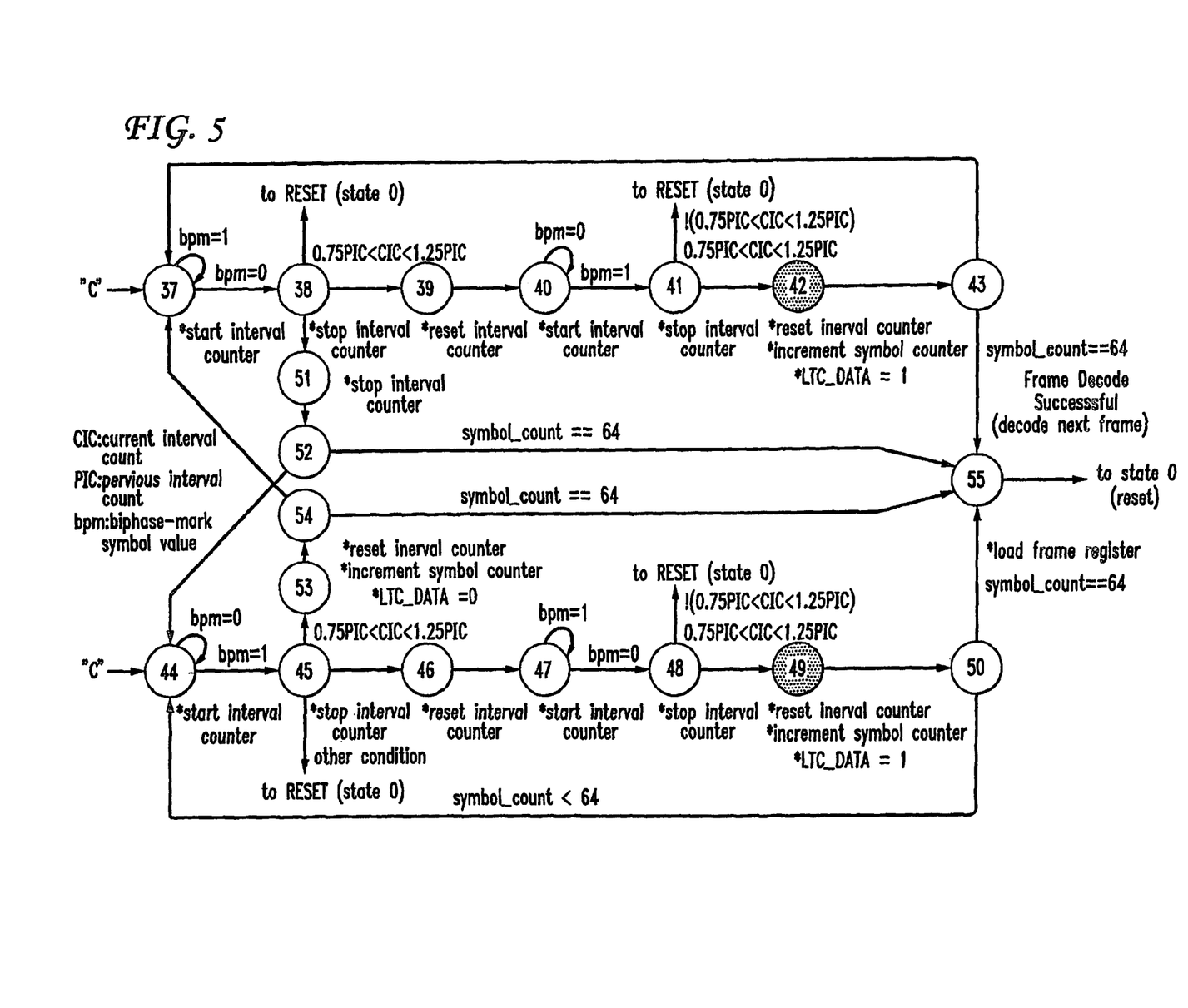
FIG. 5 depicts a state diagram for the state machine within the LTC receiver of FIG. 2 to illustrate the machine states for effecting extraction of the LTC frame payload.

FIG. 5 depicts the nineteen states of the state machine 12 associated with decoding the 64 bits in the payload of the LTC frame of FIG. 1. The 19-state data decoding sequence uses the bi-phase-mark half-symbol interval count stored in the Interval Count Reference Register 22 as the timing reference for decoding the 64-bit data payload in the LTC frame of FIG. 1. As will become better understood from a description of the individual states of the decoding sequence, two consecutive transitions with durations within +/−25% of the reference half-symbol count are decoded as a NRZ logic 1, while a transition with a duration within +/−25% of twice the reference count is decoded as a NRZ logic 0. Every sequential decode loads the equivalent NRZ bit into the Shift Register 24 of FIG. 2 in the direction indicated by the direction flag, and increments the Data Symbol Counter 18. When the count of the Data Symbol Counter reaches sixty-four, the contents of the shift register 24 are transferred to the 64-bit buffer register 26 and the Transfer OK flag is asserted. This register is read while the next frame undergoes decoding.

Referring to FIG. 5, the decoding sequence for a reverse-true or forward-true bi-phase mark stream commences upon entry of State 37 following either of States 22 or 36 of FIG. 4. As described hereinafter, the decoding sequence commences for a reverse-complement or forward-complement bi-phase mark stream upon entry of State 44 of FIG. 5 following one of States 26 or 32 of FIG. 4. Upon entering State 37, the state machine 12 causes the Half Symbol Duration Counter 14 to commence counting. State 37 remains active for so long as the bi-phase mark symbol value remains a logic one level. Upon a transition of the bi-phase mark symbol value to a logic zero, State 38 becomes active, whereupon the Half Symbol Duration Counter 14 stops counting. From State 38, the state machine 12 of FIG. 2 enters State 51 when the condition 1.75 PIC<CIC<2.25 PIC is true; or enters State 33 when the condition 0.75 PIC<CIC<1.25 PIC is true. If neither condition is true, the state machine 12 enters State 0 of FIG. 3. Transitioning to State 0 indicates an invalid data payload bit pattern was detected, and the state machine 12 is reset. Upon entering State 39 of FIG. 5, the state machine 12 resets the Half Symbol Duration Counter 14. Thereafter, State 40 becomes active, whereupon the Half Symbol Duration Counter 14 starts counting.

State 40 remains active so long as the bi-phase mark symbol value remains a logic zero. Upon a transition of the bi-phase mark symbol value to a logic one value, State 41 becomes active, and the Half Symbol Duration Counter 14 stops counting. Following State 41, State 42 becomes active if the condition 0.75 PIC<CIC<1.25 PIC is true, otherwise, State 0 of FIG. 3 becomes active. Transitioning to State 0 indicates an invalid data payload bit pattern was detected, and the state machine 12 is reset. Upon entry into State 42 of FIG. 5, the state machine 12 of FIG. 2 resets the Half Symbol Duration Counter 14 and increments the Data Symbol Counter 18 of FIG. 2. Also, during State 42, the state machine 12 sets a variable LTC_Data to a logic one value. This value is simultaneously shifted into the 64-Bit Shift Register 24 in a direction (MSB first or LSB first) dictated by the value of the Direction Flag ("FORWARD" or "REVERSE"). LTC_Data is the NRZ equivalent of the decoded bi phase-mark data payload bit. Following State 42, State 43 becomes active, whereupon a comparison occurs between the count of the Data Symbol counter 18, hereinafter referred to as symbol_count, and the value sixty-four. If the symbol_count equals sixty-four, indicating that all of the bits of the 64-bit payload of the LTC fame have undergone decoding, then the frame decoding has been successful, and State 55 becomes active, whereupon the contents of the 64-Bit Shift Register 24 are transferred to the 64-Bit Buffer Register 26 prior to proceeding to State 0. After transitioning to State 0, the State Machine 12 is ready to start decoding a subsequent LTC frame. Otherwise, should the symbol_count not exceed sixty-four, then following State 43, State 37 once again becomes active to commence the process of decoding a successive symbol value.

Following State 38, State 51 becomes active when the condition 1.75 PIC<CIC<2.25 PIC is true; rather entering state 39 when 0.75 PIC<CIC<1.25 PIC is true. Upon entering State 51, the state machine 12 resets the Half Symbol Duration Counter 14 and increments the Data Symbol Counter 18. Also, the state machine 12 sets the variable LTC_Data to a logic zero value. This value is simultaneously shifted into the 64-Bit Shift Register 24 in a direction (MSB first or LSB first) dictated by the value of the Direction Flag ("FORWARD" or "REVERSE"); State 52 becomes active following State 51 and a check of the value of the symbol_count of Symbol Counter 18 of FIG. 2 occurs at this time. When the symbol_count equals or exceeds sixty-four, State 55 becomes active. Otherwise when the symbol_count is less than sixty-four, State 44 becomes active.

State 44 of FIG. 5 also becomes active following States 26 and 32 of FIG. 4. Upon entering State 44, the state machine 12 causes the Half Symbol Duration Counter 14 to commence counting. State 44 remains active for so long as the bi-phase mark symbol value remains a logic zero level. Upon a transition of the bi-phase mark symbol value to a logic one, State 45 becomes active, whereupon the Half Symbol Duration Counter 14 stops counting. From State 45, the state machine 12 of FIG. 2 enters State 53 when the condition 1.75 PIC<CIC<2.25 PIC is true; or enters State 46 when the condition 0.75 PIC<CIC<1.25 PIC is true. If neither condition is true, the state machine 12 enters State 0 of FIG. 3. Transitioning to State 0 indicates an invalid data payload bit pattern was detected, and the state machine 12 is reset. Upon entering State 46, the state machine 12 resets the Half Symbol Duration Counter 14. Thereafter, State 47 becomes active, whereupon state machine 12 causes the Half Symbol Duration Counter 14 to commence counting. State 47 remains active so long as the bi-phase mark symbol value remains at logic one level. Upon a transition of the bi-phase mark symbol value to a logic zero value, State 48 becomes active, and the Half Symbol Duration Counter 14 stops counting. Following State 48, State 49 becomes active if the condition 0.75 PIC<CIC<1.25 PIC is true; otherwise, State 0 becomes active. Transitioning to State 0 indicates an invalid data payload bit pattern was detected, and the state machine 12 is reset. Upon entry into State 49 of FIG. 5, the state machine 12 of FIG. 2 resets the Half Symbol Duration Counter 14 and increments the Data Symbol Counter 18 of FIG. 2. Also, at this time, the state machine 12 sets the variable LTC_Data to a logic one value. This value is simultaneously shifted into the 64-Bit Shift Register 24 in a direction (MSB first or LSB first) dictated by the value of the Direction Flag ("FORWARD" or "REVERSE"). Following State 49, State 50 becomes active, whereupon a comparison occurs between the symbol_count, and the value sixty-four. If the symbol_count equals or exceeds sixty-four, then LTC frame decoding has been successful and State 55 becomes active, whereupon the contents of the 64-Bit Shift Register 24 are transferred to the 64-Bit Buffer Register 26, prior to proceeding to State 0 of FIG. 2. After transitioning to State 0, the State Machine 12 is ready to start decoding a subsequent LTC frame. Otherwise, should the symbol_count not exceed sixty-four, then following State 50, State 44 once again becomes active to commence the process of decoding a successive symbol value.

Following State 45, State 53 becomes active when the condition 1.75 PIC<CIC<2.25 PIC is true; rather than entering state 46 when 0.75 PIC<CIC<1.25 PIC is true. Upon entering State 53, the state machine 12 resets the Half Symbol Duration Counter 14 and also increments the Data Symbol Counter 18. Also, the state machine 12 sets the variable LTC_Data to a logic zero value. This value is simultaneously shifted into the 64-Bit Shift Register 24 in a direction (MSB first or LSB first) dictated by the value of the Direction Flag ("FORWARD" or "REVERSE"). State 54 becomes active following State 51 and a check of the value of the symbol_count occurs at this time. When value of the symbol_count equals or exceeds sixty-four, State 55 becomes active, signifying successful LTC frame decoding (extraction). Otherwise when the symbol_count equals is less than sixty-four, State 37 becomes active, whereupon the state machine 12 causes the Half Symbol Duration Counter 14 to commence counting in the manner described previously.

The LTC receiver 10 is capable of decoding LTC bi-phase-mark encoded data streams over any combination of the following operating conditions:

Forward and reverse stream directions

Bit symbol rates from X/30 to 80*X, where X is the nominal LTC frame rate

True and complement data polarity

Reverse data streams can be generated when an audio linear tape track (not shown) storing the LTC stream is operated in the reverse direction. Bit symbol rates other than nominal can be generated when the audio linear tape track storing the LTC stream is operating in jog or shuttle mode. The nominal bit symbol rates for various video or film frame rates is given by Fs=80*Fr, where Fr is the video/film frame rate.

A summary of nominal, minimum, and maximum bit symbol rates appear in Table II below.

TABLE II

| video/film frame rate | nominal LTC bit symbol rate (X) | Minimum LTC bit symbol rate (X/30) | Maximum LTC bit symbol rate (80*X) |
|---|---|---|---|
| 30 frames/sec | 2400 bits/sec | 80 bits/sec | 192,000 bits/sec |
| 29.97 frames/sec | 2397.6 bits/sec | 79.92 bits/sec | 191,808 bits/sec |
| 25 frames/sec | 2000 bits/sec | 66.666 . . . bits/sec | 160,000 bits/sec |
| 24 frames/sec | 1920 bits/sec | 64 bits/sec | 153,600 bits/sec |

Because of the nature of the bi-phase-mark modulation method, the polarity of the transition of the first bit of the synchronization word may differ from LTC frame to LTC frame depending on the number of logical zeros in the data. The LTC receiver 10 thus has the capability of decoding streams of either true or complement polarity.

The foregoing describes a LTC-frame receiver 10 having completely digital implementation capable of operating with a high-speed clock that can be asynchronous to the LTC bit symbol rate.

The invention claimed is:

1. A method for decoding a received incoming Linear Time Code (LTC) frame of the type used in connection with film and television and accompanying audio, comprising the steps of
    (a) detecting a valid synchronization sequence within the incoming LTC frame while measuring a predetermined symbol interval relative to a reference clock, including:
    triggering a half-symbol duration counter upon a first phase change in a bi-phase mark symbol of a synchronization word;
    upon a second change of the bi-phase mark symbol, stopping the half-symbol duration counter, storing a current count, and resetting the half-symbol duration counter;
    counting the half-symbol duration until a third change of the bi-phase mark symbol; and
    comparing the current count to a previously stored count to determine whether the synchronization sequence is valid;
    (b) determining a LTC frame direction;
    (c) decoding a payload information from the LTC frame following the determination of the LTC frame direction; and
    (d) transferring the payload information in an order determined by the LTC frame direction.

2. The method according to claim 1 wherein the step of measuring the predetermined symbol interval duration comprises the step of measuring how many 27 MHz clock periods occur within a duration of bi-phase encoded half mark symbol interval within the LTC frame.

3. The method according to claim 2 wherein the decoding step further comprises the step of extracting successive symbols from the LTC frame using the measured 27 MHz clock periods as a reference.

4. The method according to claim 3 wherein a minimum required symbol interval for the 27 MHz clock is seventy clock periods.

5. The method according to claim 3 wherein a maximum allowable symbol interval for the 27 MHz clock is 210,937 clock periods.

6. The method according to claim 1 further including the step of filtering each incoming LTC to remove a glitch.

7. The method according to claim 1 wherein steps (a)-(d) are repeated upon receipt of each successive LTC frame.

8. An LTC receiver for decoding a Linear Time Code (LTC) frame of the type used in connection with film and television and accompanying audio, comprising
    (a) first means for detecting a valid synchronization sequence within an incoming LTC frame while measuring a predetermined symbol interval relative to a reference clock, including:
    means for triggering a half-symbol duration counter upon a first phase change in a bi-phase mark symbol of a synchronization word;
    means for stopping the half-symbol duration counter, storing a current count, and resetting the half-symbol duration counter, upon a second change of the bi-phase mark symbol;
    means for counting the half-symbol duration until a third change of the bi-phase mark symbol; and
    means for comparing the current count to a previously stored count to determine whether the synchronization sequence is valid;
    (b) second means for determining a LTC frame direction;
    (c) third means for decoding a payload information from the LTC frame following the determination of the LTC frame direction; and
    (d) fourth means for transferring the payload information in an order determined by the LTC frame direction.

9. The LTC receiver according to claim 8 wherein the first means includes a first counter for measuring the predetermined symbol interval duration comprises the step of measuring how many 27 MHz clock periods occur within a duration of bi-phase encoded half mark symbol interval within the LTC frame.

10. The LTC receiver according to claim 8 wherein the second means includes a second counter for counting sync pulses in the incoming LTC frame to determine the LTC frame direction.

11. The LTC receiver according to claim 8 wherein the third means includes a data symbol counter for counting symbols within the incoming LTC frame.

12. The LTC receiver according to claim 8 wherein the fourth means includes a state machine.

13. An LTC receiver for decoding a Linear Time Code (LTC) frame of the type used in connection with film and television and accompanying audio, comprising
    a first counter for measuring a predetermined symbol interval relative to a reference clock, wherein the first counter begins counting a half-symbol duration upon a first phase change in a bi-phase mark symbol of a synchronization word, wherein the first counter stops counting the half-symbol duration upon a second change of the bi-phase mark symbol, stores a current count, and resets the half-symbol duration counter; and wherein the first counter counts the half-symbol duration until a third change of the bi-phase mark symbol;
    a second counter for counting synchronization pulses within the incoming LTC frame;
    a third counter for counting data symbols within the incoming LTC frame;
    a shift register and
    a state machine responsive to the counts of the first, second and third counters for (a) detecting a valid synchronization sequence within an incoming LTC frame, (b) determining a LTC frame direction; (c) decoding a payload information from the LTC frame following the determination of the LTC frame direction; and (d) for transferring the payload information to the shift register in an order determined by the LTC frame direction, wherein the valid synchronization sequence is detected by comparing the current count to a previously stored.

14. The apparatus according to claim 13 further comprising a glitch filter for filtering the incoming LTC frame to remove glitches.

15. The apparatus according to claim 13 wherein the first counter measures the predetermined symbol interval duration by measuring how many 27 MHz clock periods occur within a duration of bi-phase encoded half mark symbol interval within the LTC frame.

* * * * *